(12) United States Patent
Yasaki

(10) Patent No.: US 11,496,633 B2
(45) Date of Patent: Nov. 8, 2022

(54) IMAGE PROCESSING APPARATUS AND SERVER APPARATUS WITH INTERACTIVE REFINEMENT OF STREAK DETECTION, CONTROL METHOD THEREFOR, AND STORAGE MEDIUM

(71) Applicant: CANON KABUSHIKI KAISHA, Tokyo (JP)

(72) Inventor: Kosuke Yasaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/167,543

(22) Filed: Feb. 4, 2021

(65) Prior Publication Data

US 2021/0258434 A1    Aug. 19, 2021

(30) Foreign Application Priority Data

Feb. 19, 2020  (JP) .............................. JP2020-026475

(51) Int. Cl.
  *H04N 1/00*   (2006.01)
  *G06N 3/08*   (2006.01)
  *G06N 3/04*   (2006.01)

(52) U.S. Cl.
  CPC .......... *H04N 1/00087* (2013.01); *G06N 3/04* (2013.01); *G06N 3/08* (2013.01); *H04N 1/00018* (2013.01); *H04N 1/00037* (2013.01); *H04N 1/00819* (2013.01)

(58) Field of Classification Search
  CPC .......... H04N 1/00037; H04N 1/00047; H04N 1/00087; H04N 1/00063; H04N 1/00819; H04N 1/00058; H04N 1/00061
  USPC ............................... 358/1.15, 504, 505, 406
  See application file for complete search history.

(56) References Cited

U.S. PATENT DOCUMENTS

| | | | |
|---|---|---|---|
| 6,985,220 B1 | 1/2006 | Chen et al. | 356/237.5 |
| 8,203,761 B2 | 6/2012 | Arima | 358/3.26 |
| 2009/0244657 A1 | 10/2009 | Arima | 358/483 |
| 2015/0138588 A1* | 5/2015 | Matsuzaki | H04N 1/00 358/1.14 |
| 2017/0064095 A1* | 3/2017 | Matsuzaki | H04N 1/00029 |
| 2017/0318172 A1* | 11/2017 | Matsuzaki | H04N 1/00721 |
| 2021/0084188 A1* | 3/2021 | Hiroe | H04N 1/047 |

FOREIGN PATENT DOCUMENTS

| | | |
|---|---|---|
| JP | 2009-239358 | 10/2009 |
| JP | 2010-286501 | 12/2010 |

* cited by examiner

*Primary Examiner* — Kent Yip

(74) *Attorney, Agent, or Firm* — Venable LLP

(57) ABSTRACT

There is provided an information processing apparatus. The information processing apparatus acquires image data of a document read via a scanner; detects a streak included in the image data acquired by the acquisition unit by using a parameter for detection processing of detecting a streak; transmits the image data, the parameter, and a detection result obtained by the detection unit to an external apparatus; and changes the parameter used by the detection unit upon reception of a change in the parameter from the external apparatus.

11 Claims, 11 Drawing Sheets

FIG. 4
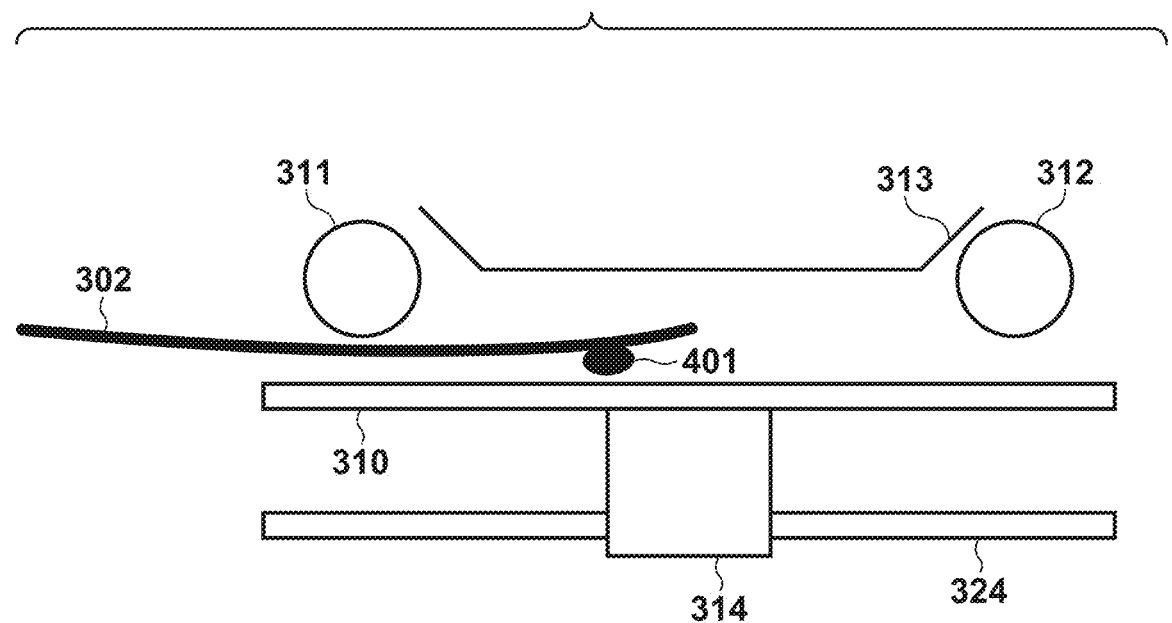
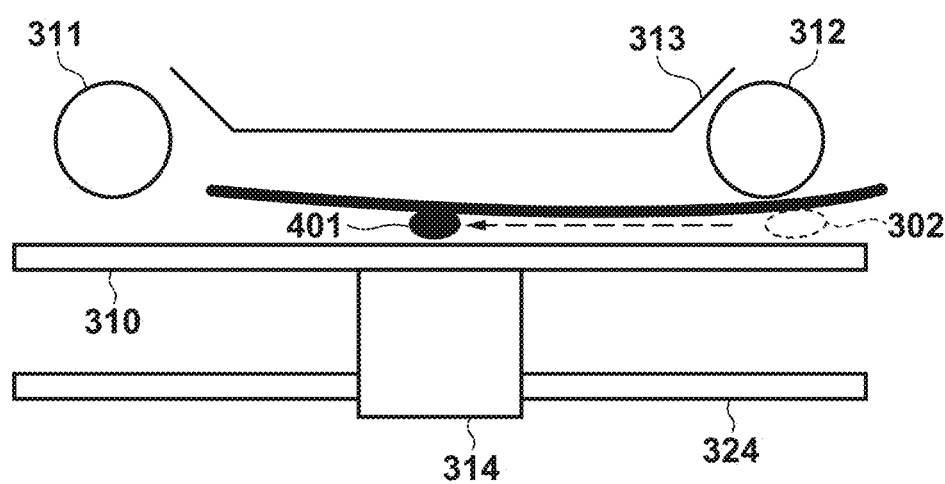

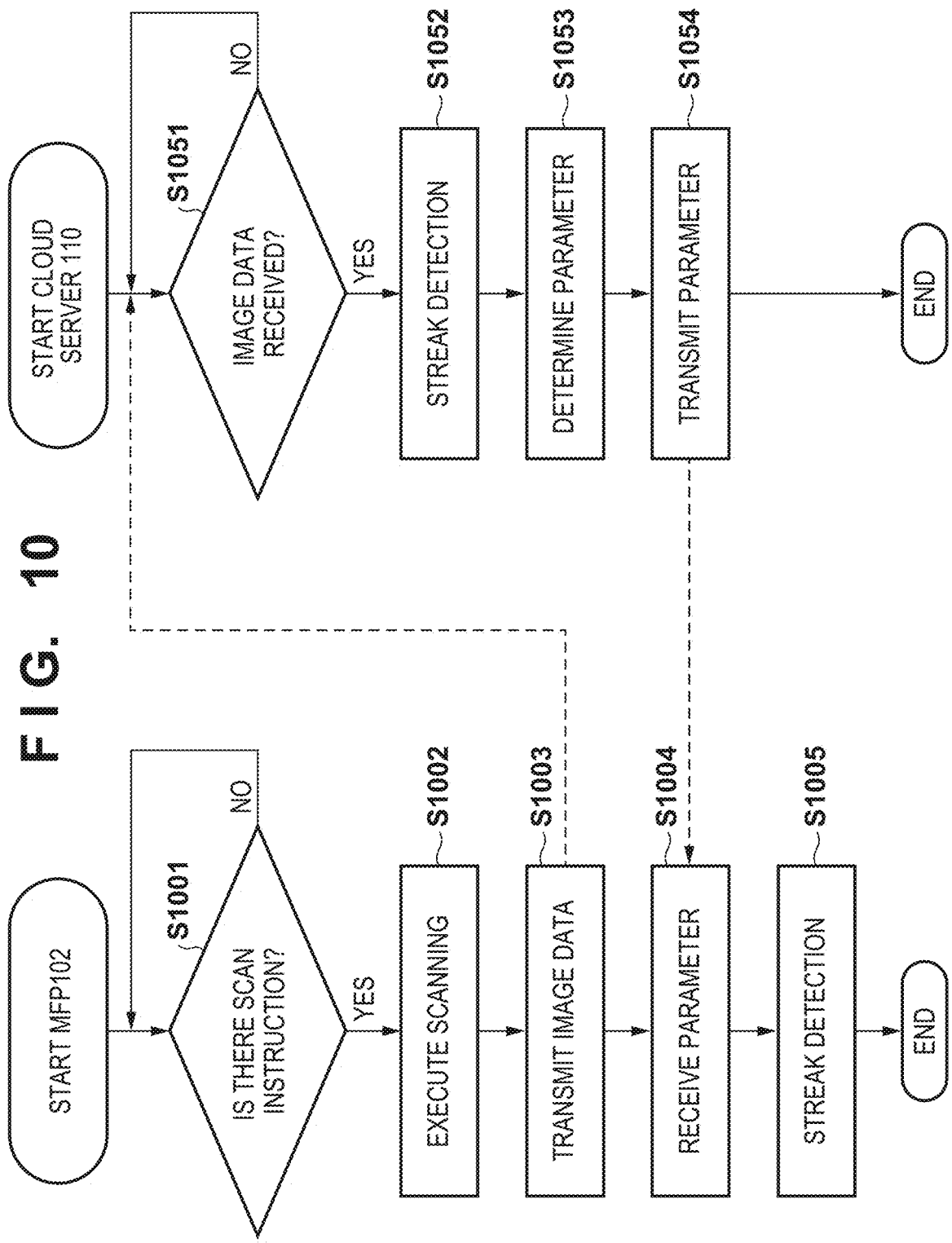

IMAGE PROCESSING APPARATUS AND SERVER APPARATUS WITH INTERACTIVE REFINEMENT OF STREAK DETECTION, CONTROL METHOD THEREFOR, AND STORAGE MEDIUM

BACKGROUND OF THE INVENTION

Field of the Invention

The present invention relates to an information processing apparatus and a server apparatus which can detect a streak image, a control method for the apparatuses, and a storage medium.

Description of the Related Art

A conventional multifunction printer (to be referred to as an MFP hereinafter) conveys documents placed on a document tray one by one with an auto document feeder (to be referred to as an ADF hereinafter). When a conveyed document passes over a scanning glass at a read position, the MFP reads the document surface by irradiating the document with light from a light source and reflecting the reflected light by a mirror to make the light enter an image sensor such as a CCD sensor.

In this case, dust such as paper powder adhering to a document or toner used for printing may come off, when the document is conveyed, and adhere to the scanning glass on the document read position. When the MFP reads a document image while dust such as paper powder and toner adheres on the scanning glass, light entering the image sensor is blocked. As a result, a longitudinal streak is sometimes generated on the document image data at the position of the adhering dust (Japanese Patent Laid-Open Nos. 2009-239358 and 2010-286501). In this specification, document image data on which a longitudinal streak not included in an original document is caused by the adherence of dust or the like will be referred to as a streak image.

Japanese Patent Laid-Open No. 2009-239358 proposes a method including detecting a streak candidate from an image, determining the continuity of the streak candidate in the sub-scanning direction, executing, if a predetermined condition is satisfied, correction upon determining that the streak candidate is a streak, and skipping correction, if the predetermined condition is not satisfied, upon determining that the streak candidate is not a streak.

In addition, Japanese Patent Laid-Open No. 2010-286501 proposes a method of manually adjusting a threshold used for the detection of an abnormal image in an inspection system.

However, a method of detecting a streak by using an image processing algorithm like that disclosed in Japanese Patent Laid-Open No. 2009-239358 has sometimes difficulty in properly adjusting parameters for properly detecting streaks that are generated in various patterns. The adjustment of parameters requires a large amount of calculation, and hence the parameters are sometimes insufficiently adjusted. Assume that insufficiently adjusted parameters are used. In this case, since the parameters are finely adjusted until sufficient detection accuracy and an allowable false positive rate can be obtained with respect to typical streaks, streak detection sometimes fails, and an image on a document is sometimes falsely detected as a streak.

In addition, as disclosed in Japanese Patent Laid-Open No. 2010-286501, manual adjustment of parameters requires a dedicated person in charge and much adjustment time, resulting in a deterioration in productivity.

SUMMARY OF THE INVENTION

An aspect of the present invention is to eliminate the above-mentioned problem with conventional technology.

A feature of the present invention is to provide a technique of improving convenience in the adjustment of parameters used for streak detection by an image processing apparatus.

According to a first aspect of the present invention, there is provided an information processing apparatus comprising: an acquisition unit configured to acquire image data of a document read via a scanner; a detection unit configured to detect a streak included in the image data acquired by the acquisition unit by using a parameter for detection processing of detecting a streak; a transmission unit configured to transmit the image data, the parameter, and a detection result obtained by the detection unit to an external apparatus; and a changing unit configured to change the parameter used by the detection unit upon reception of a change in the parameter from the external apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing a process in which a streak image is generated;

FIG. 10 is a flowchart showing an example of processing executed by an MFP and a cloud server according to the second embodiment;

DESCRIPTION OF THE EMBODIMENTS

Figure 1:
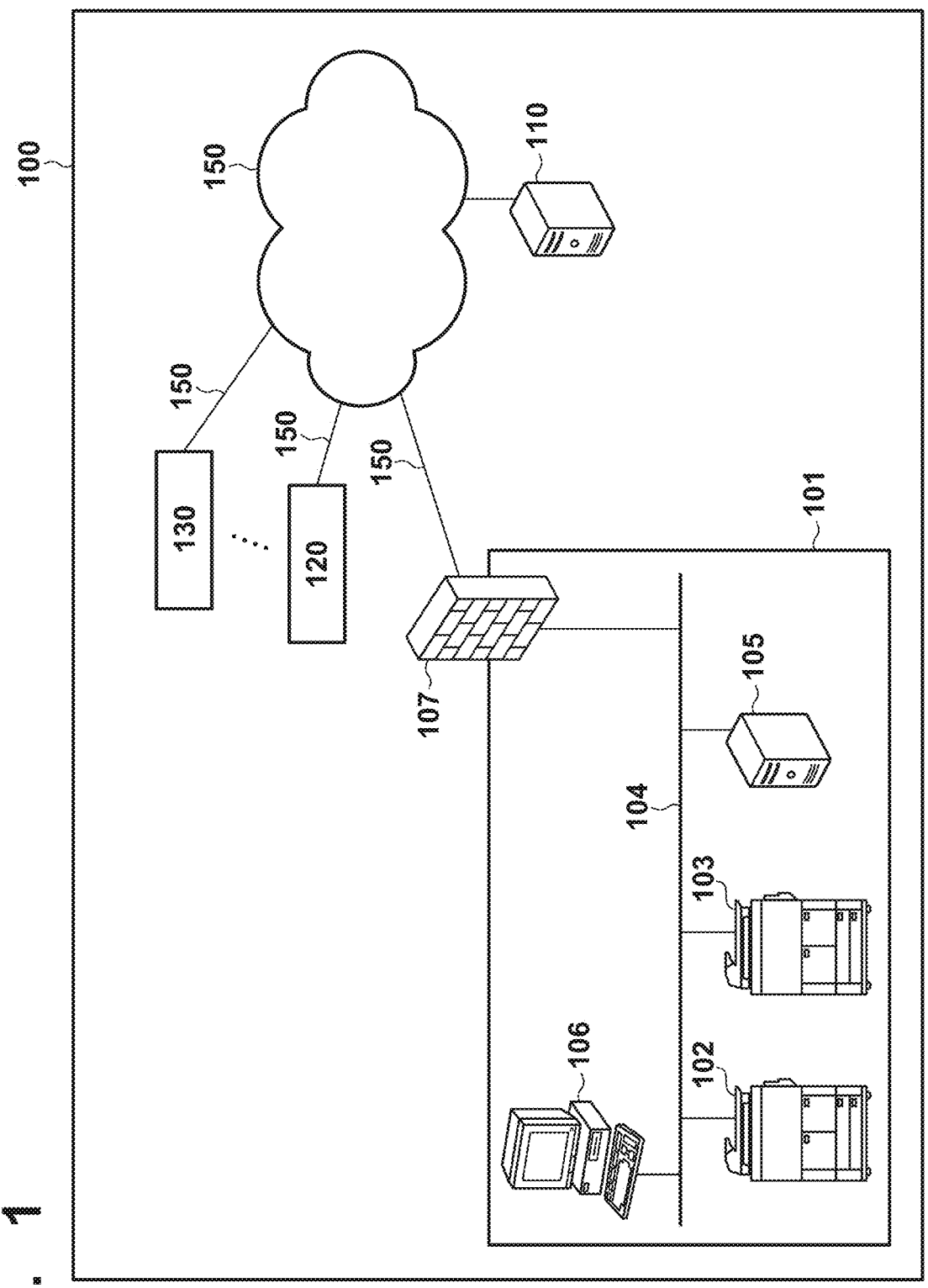
FIG. 1 is a view showing the configuration of a network system according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Obviously, the present invention can be applied to a single device and a system constituted by a plurality of devices as long as the functions of the present invention can be implemented unless otherwise specified.

First Embodiment

FIG. 1 is an overall view of a network system 100 according to the present invention. The network system 100 is constituted by offices 101, 120, and 130, a cloud server 110, and the Internet 150 that connects the offices and the cloud server. Although FIG. 1 shows the offices in three places, offices in a plurality of arbitrary places may be connected to the cloud server 110 via the Internet 150. The configuration of each office will be described by exemplifying the office 101. In this case, as is obvious, although the respective offices have different internal configurations, the following configurations are representative ones, and a description of configurations that are not directly associated with this embodiment will be omitted.

A firewall 107 is installed between the office 101 and the Internet 150. The firewall 107 manages to block unauthorized access into the office 101. On the other hand, the firewall 107 permits the reception of necessary data and manages the transmission of data from the office 101 to the Internet 150. The firewall 107 is connected to a network 104 inside the office so as to be connected to each apparatus in the office. Multifunctional printers (MFPs) 102 and 103, a printer server 105, and a client PC 106 are communicably connected to the network 104.

The MFPs 102 and 103 each is an information processing apparatus including a printing apparatus having a function of reading a document sheet, transmitting the obtained data to the network 104, and printing the read document image data. The client PC 106 can transmit print data to the printer server 105 via the network 104 and print out the print data from the MFP 102 or 103. In addition, the client PC 106 can transmit and receive data to and from the Internet 150 via the network 104 and the firewall 107.

The cloud server 110 is one or more computers, and is a server apparatus that receives image data from the MFPs 102 and 103 and transmits signals for designating parameters used for streak detection to the MFPs 102 and 103.

Figure 2:
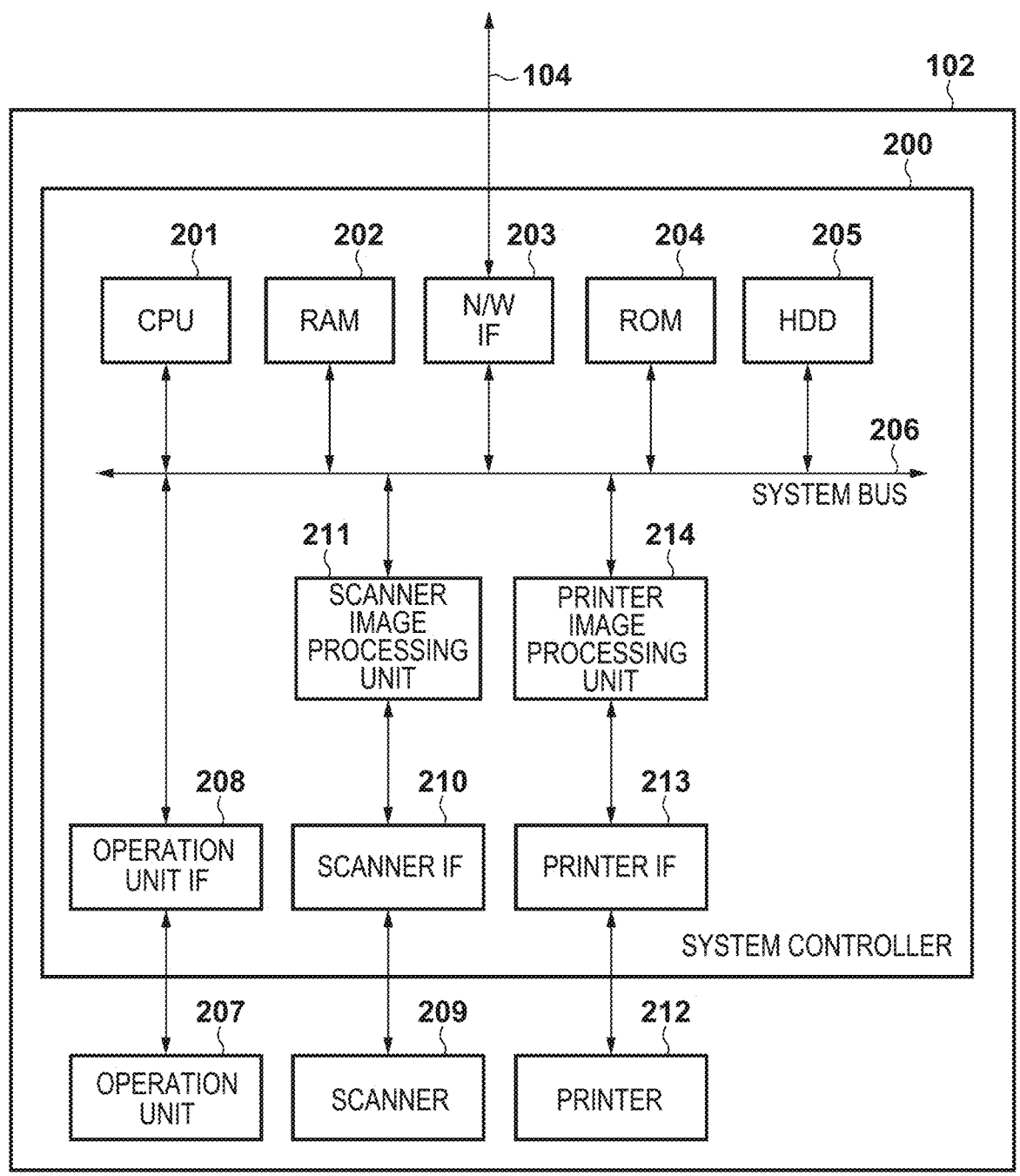
FIG. 2 is a block diagram showing the configuration of an MFP according to an embodiment.

FIG. 2 is a block diagram showing the configuration of an MFP according to this embodiment. FIG. 2 illustrates the MFP as the MFP 102. Assume, however, that the MFP 103 has the same configuration as that of the MFP 102. The MFP 102 includes a system controller 200, an operation unit 207, a scanner 209, and a printer 212.

The system controller 200 is connected to the scanner 209 that is an image input device (scanner), the printer 212 that is an image output device (output unit), the operation unit 207, and the network 104. The system controller 200 controls the overall operation of the MFP 102 and also performs input/output control for image information (to be described later), device information, and the like. The system controller 200 includes a CPU 201, a RAM 202, a network interface (N/W IF) 203, and a ROM. The CPU is an abbreviation for Central Processing Unit. The RAM is an abbreviation for Random Access Memory. The ROM is an abbreviation for Read Only Memory. The system controller 200 includes an HDD 205, an operation unit IF 208, a scanner IF 210, a printer IF 213, a scanner image processing unit 211, and a printer image processing unit 214. The HDD is an abbreviation for Hard Disk Drive. Note that the CPU 201 is communicably connected to each of the above constituent elements via a system bus 206.

The CPU 201 is a processor that controls the MFP 102 as a whole. The CPU 201 controls access to various types of devices connected to the system controller 200 based on control programs and the like stored in the ROM 204. In addition, the CPU 201 controls various types of processing executed inside the system controller 200.

The RAM 202 is a system work memory and also functions as an image memory for temporarily storing image data and the like read by the scanner 209. The ROM 204 is a boot ROM and stores a boot program to be executed at the startup of the system controller 200.

The HDD 205 mainly stores information (system software) required to start/operate the MFP and image data. These data may be stored in a recording medium that can store and hold the data at the time of power-off as well as the HDD 205. When the N/W IF 203 is connected to the network 104, the N/W IF 203 allows the system controller 200 to input and output image data from and to external apparatuses on a network or input and output information concerning device control.

The operation unit IF 208 receives image data to be displayed on the operation unit 207 from the CPU 201 via the system bus 206 and transmits the data to the operation unit 207. The operation unit IF 208 also receives operation information and the like from the operation unit 207 and transmits the information to the CPU 201.

The scanner IF 210 receives document image data read by the scanner 209 and transmits the data to the scanner image processing unit 211. The scanner image processing unit 211 generates optimal scan image data by performing image processing such as resolution conversion, color appearance correction, streak detection, and streak correction for the document image data read by the scanner 209. The scanner image processing unit 211 is connected to the system bus 206 to transmit scan image data having undergone image processing to the RAM 202 and the like. In addition, the scanner image processing unit 211 holds parameters for a streak detection algorithm and updates held parameters upon receiving new parameters from the cloud server 110.

The printer image processing unit 214 transmits print image data received from the CPU 201 via the system bus 206 to the printer IF 213. The printer image processing unit 214 generates optimal print image data by performing image processing such as density conversion for received print image data. The printer IF 213 transmits received print image data having undergone image processing to the printer 212 and performs a printing operation.

Figure 3:
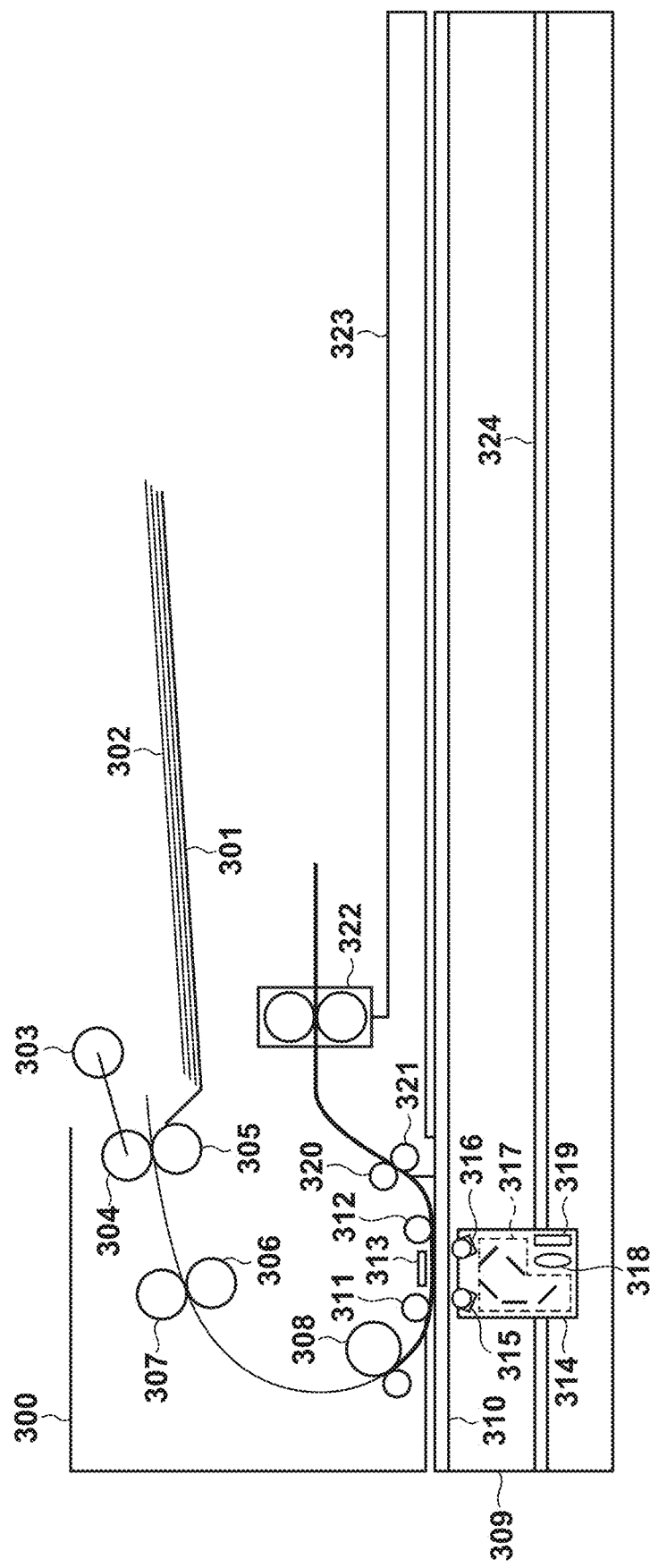
FIG. 3 is a sectional view of a reader unit and an ADF according to an embodiment.

The operation of the scanner 209 will be described next with reference to FIG. 3 by using sectional views of a reader unit 309 and an ADF (Auto Document Feeder) 300 included in the scanner 209.

When a batch of documents is placed on a document tray 301 and a read instruction is issued, the ADF 300 conveys documents so as to allow the reader unit 309 to read documents in the following manner. First of all, a pickup roller 303 conveys documents 302 included in the batch of documents from the document tray 301 to a separator. The separator makes a separation conveyance roller 304 and a separation conveyance driven roller 305 separate and convey the documents 302 one by one which is located on the top of the batch of documents. A registration roller 306 and a registration driven roller 307 correct the oblique conveyance of the one separated document. The document is then conveyed by a first conveyance roller 308, a second conveyance roller 311, and a third conveyance roller 312 in this order.

When a document is conveyed by the second conveyance roller 311 and the third conveyance roller 312 and passes over the read position, the reader unit 309 reads the document to obtain image information on the surface of the document. A scanner head 314 can move laterally along a rail 324. The document is conveyed by a read discharge roller 320, a read discharge driven roller 321, and a discharge roller 322 after passing through the third conveyance roller 312, and is delivered onto a document discharge tray 323.

The document reading operation of the reader unit 309 will be described next. While a document passes between a scanning glass 310 and a white opposing member 313 located on the read position, the scanner head 314 located below the read position irradiates the document with light from light sources 315 and 316, and guides the reflected light to an imaging lens 318 via a reflecting mirror 317. A line sensor 319 converts the light focused by the imaging lens 318 into an electrical signal.

A mechanism in which streak-like data is generated in the document image data read at this time will be described with reference to FIG. 4.

As shown in FIG. 4, when the document 302 is sequentially conveyed by the second conveyance roller 311 and the third conveyance roller 312, dust 401 adheres to the document 302. The adhering dust 401 comes in various forms such as paper debris caused at the time of conveyance and toner dust separated from the document. The adhering dust 401 can move accompanying the conveyance of the document 302. When the document 302 is conveyed, together with the adhering dust, to the read position, the scanner head 314 can read the dust 401 at the same time as reading the document 302.

Figure 5:
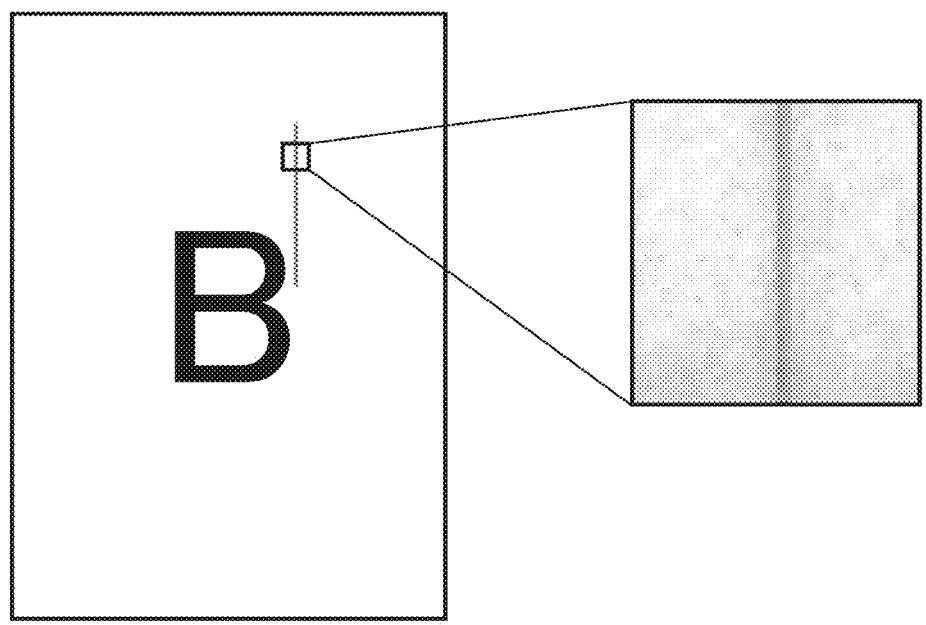
FIG. 5 is a view showing an example of a streak image.

Since the document 302 is read while being in tight contact with the scanning glass 310, a portion near the read position is narrow. Accordingly, although the document 302 is conveyed forward, the dust 401 can stay between the document 302 near the read position and the scanning glass 310. As a result, the scanner head 314 reads the dust 401, and streak-like data on a pixel is generated in the read document image data. FIG. 5 shows an example of such data. In addition, since the dust 401 does not stay in the same place, streak-like data is generated intermittently or disappears.

Figure 6:
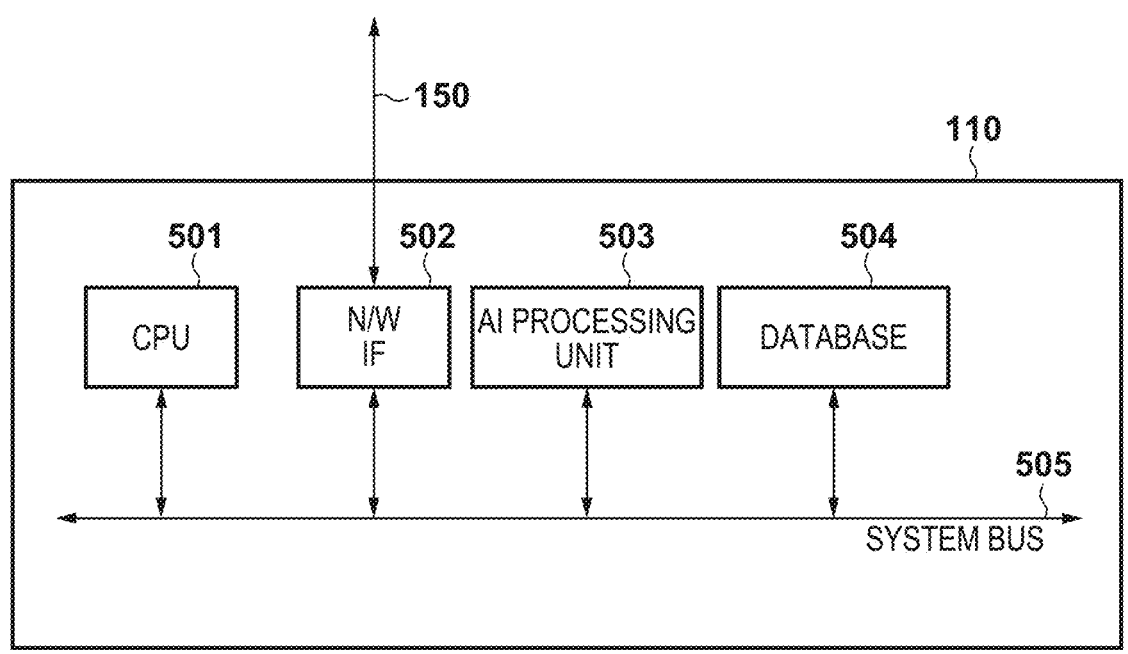
FIG. 6 is a block diagram showing the configuration of a cloud according to an embodiment.

The configuration of a cloud server 110 according to this embodiment will be described with reference to FIG. 6. A description of configurations that are not directly associated with processing by the cloud server 110 according to the embodiment will be omitted.

The cloud server 110 includes a CPU 501, an N/W IF 502, an AI (Artificial Intelligence) processing unit 503, and a database 504. The respective constituent elements are connected via a system bus 505.

The CPU 501 is a processor that controls the cloud server 110 as a whole, and executes control programs stored in a ROM (not shown). The N/W IF 502 is connected to the Internet 150 to receive image data transmitted from each office. The AI processing unit 503 detects a streak in image data by using the learned data saved in the database 504. For example, the AI processing unit 503 may include a GPU (Graphics Processing Unit).

The functional blocks of the MFP 102 and the cloud server 110 according to this embodiment will be described next with reference to FIGS. 11A and 11B. Note that the CPU 201 of the MFP 102 and the CPU 501 of the cloud server 110 implement the respective functional blocks by executing the programs stored in a computer-readable storage medium.

Figure 11A:
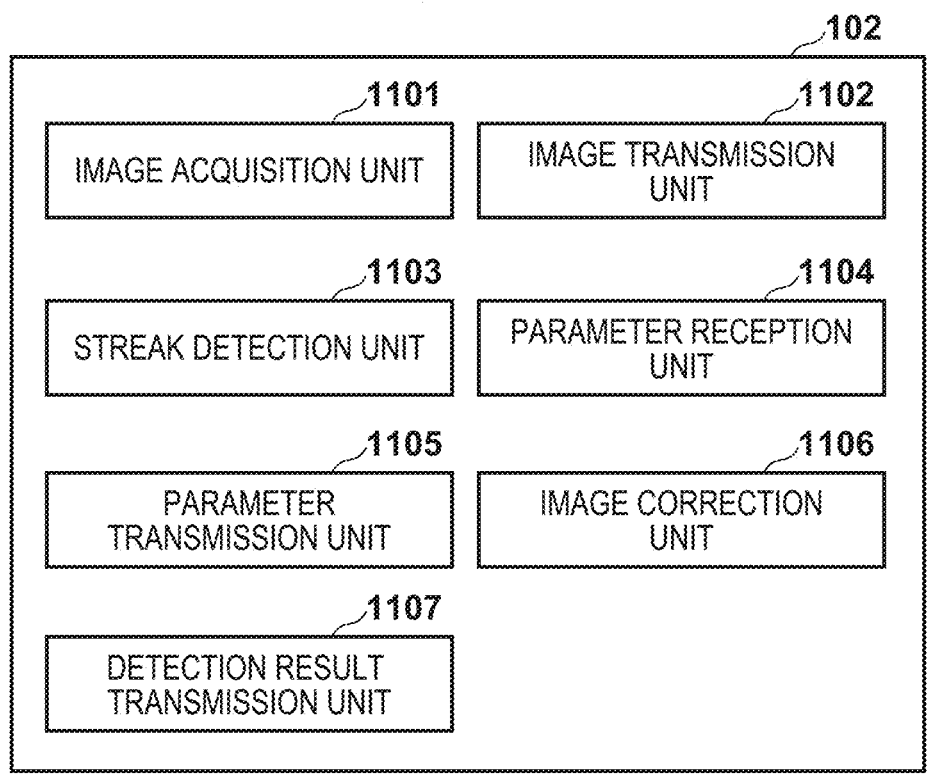
FIG. 11A is a functional block diagram of an MFP according to an embodiment.

FIG. 11A is a functional block diagram of the MFP 102. The functions of the MFP 102 include an image acquisition unit 1101, an image transmission unit 1102, a streak detection unit 1103, a parameter reception unit 1104, a parameter transmission unit 1105, an image correction unit 1106, and a detection result transmission unit 1107.

The image acquisition unit 1101 executes the control processing of acquiring an image from an image capturing apparatus such as the scanner 209 via the scanner IF 210. The image transmission unit 1102 executes the processing of transmitting the image acquired from the scanner 209 to the cloud server 110 via the N/W IF 203. The streak detection unit 1103 controls the scanner image processing unit 211 to detect a streak included in the image obtained from the scanner 209. The parameter reception unit 1104 receives parameters to be used for streak detection processing by the streak detection unit 1103 from the cloud server 110. The parameter transmission unit 1105 transmits information indicating the parameters used by the streak detection unit 1103 to the cloud server 110 via the N/W IF 203. The image correction unit 1106 generates corrected image data without any streak by correcting the streak detected by the streak detection unit 1103. The detection result transmission unit 1107 transmits the corrected image data generated by the image correction unit 1106 to the cloud server 110 via the N/W IF 203.

Figure 11B:
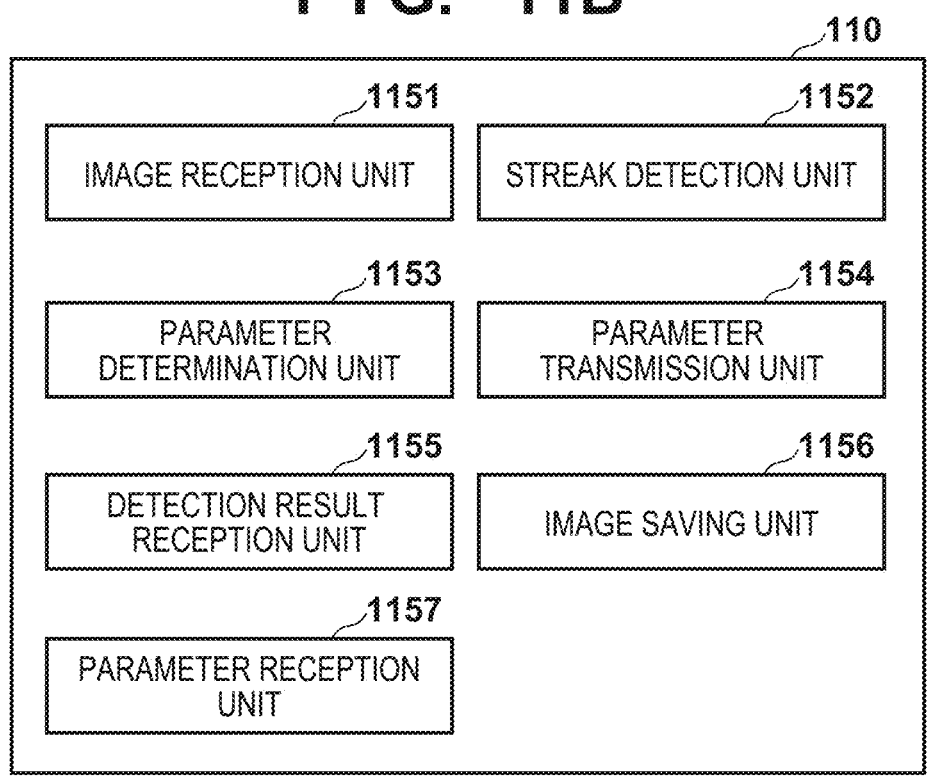
FIG. 11B is a functional block diagram of a cloud server according to an embodiment.

FIG. 11B is a functional block diagram of the cloud server 110. The functions of the cloud server 110 include an image reception unit 1151, a streak detection unit 1152, a parameter determination unit 1153, a parameter transmission unit 1154, a detection result reception unit 1155, an image saving unit 1156, and a parameter reception unit 1157.

The image reception unit 1151 receives the image data acquired by scanning a document with the MFP 102 via the N/W IF 502. The streak detection unit 1152 detects a streak included in the image data received by the image reception unit 1151 by using a learned model. For example, the streak detection unit 1152 executes learning processing using the learned model based on the image received by the image reception unit 1151. The parameter determination unit 1153 determines parameters to be used for streak detection processing by the MFP 102 based on the streak detected by the streak detection unit 1152. The parameter transmission unit 1154 transmits the parameters to be used for streak detection, which are determined by the parameter determination unit 1153, to the MFP 102 via the N/W IF 502.

The detection result reception unit 1155 receives a detection result of the streak detection processing executed by the MFP 102 via the N/W IF 502. The image saving unit 1156 saves the image received by the image reception unit 1151. The parameter reception unit 1157 receives information indicating the parameters used for streak detection processing by the MFP 102 via the N/W IF 502.

Figure 7:
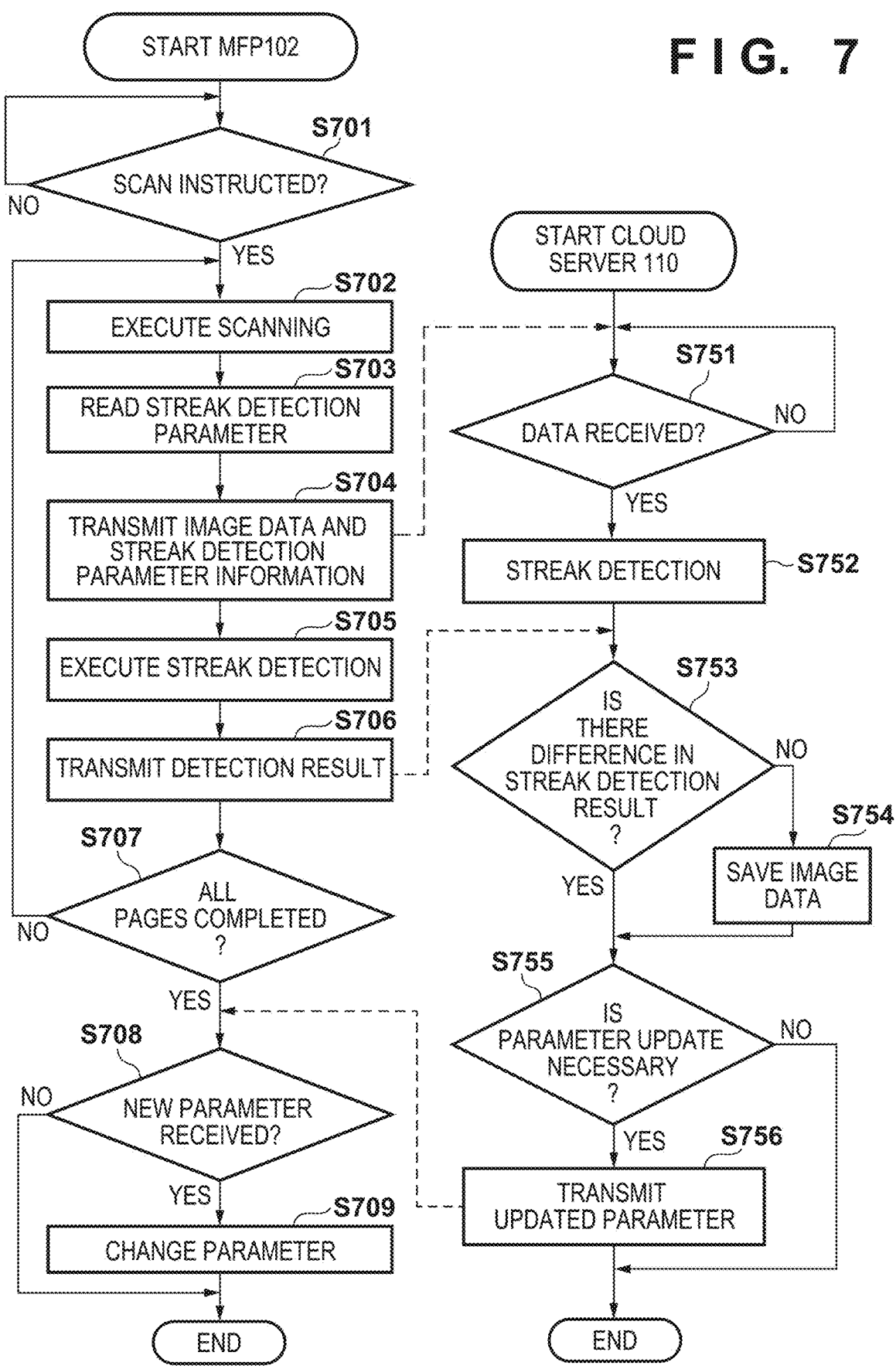
FIG. 7 is a flowchart showing an example of processing executed by an MFP and a cloud server according to the first embodiment.

The manner of handling a read image will be described in detail with reference to the flowchart associated with the MFP 102 and the cloud server 110 in FIG. 7. The processing by the MFP 102 shown in FIG. 7 is executed by the CPU 201 of the MFP 102 in accordance with programs stored in the ROM 204 unless otherwise specified. In addition, the CPU 501 of the cloud server 110 implements the processing executed by the cloud server 110 in FIG. 7 by executing the program stored in a ROM (not shown) unless otherwise specified.

In step S701, the CPU 201 determines whether the scan button of the operation unit 207 is pressed to issue a scan instruction to the MFP. If a scan instruction is issued (YES in step S701), the CPU 201 makes the process advance to step S702. In step S702, the CPU 201 reads the document with the scanner 209 based on the scan instruction, and makes the process advance to step S703.

In step S703, the CPU 201 reads out streak detection parameters saved in the HDD 205, and makes the process advance to step S704. In step S704, the CPU 201 transmits the read image data and information about streak detection parameters to the scanner image processing unit 211, and also transmits the information to the cloud server 110 via the N/W IF 203.

In step S705, the scanner image processing unit 211 performs streak detection and correction for the image data read by the scanner image processing unit 211 using the received streak detection parameters. The image data processed by the scanner image processing unit 211 is transmitted to the cloud server 110 via the N/W IF 203 and stored in the RAM 202. The image data stored in the RAM 202 is used to be printed on a sheet of paper by the printer 212 or transmitted as digital data to the client PC 106.

Subsequently, in step S706, the MFP 102 transmits the image data having undergone streak detection and correction to the cloud server 110 via the N/W IF 203, and makes the process advance to step S707. In step S707, the CPU 201 checks whether there is any document left which is to be read by the scanner 209. If processing for all the pages is not completed (NO in step S707), the next document is conveyed, and the process advances to step S702. If the processing for all the documents is completed (YES in step S707), the MFP 102 makes the process advance to step S708.

In step S708, the MFP 102 determines whether it has received a new streak detection parameter from the cloud server 110 via the N/W IF 203. Upon determining that no new streak detection parameter has been received (NO in step S708), the MFP 102 terminates the processing in FIG. 7. In contrast to this, if the MFP 102 determines that it has received a new streak detection parameter from the cloud server 110 (YES in step S708), the process advances to step S709 to make the CPU 201 update the streak detection parameter saved in the HDD 205 into the newly received streak detection parameter and terminate the processing in FIG. 7. For example, upon receiving a new streak detection parameter in step S708, the MFP 102 may execute streak detection processing by using the new parameter.

An example of the processing executed by the cloud server 110 that operates concurrently with an MFP will be described next with reference to FIG. 7. When a plurality of types of MFPs are connected to the cloud server 110, because the images obtained by the components mounted on the respective types may have different characteristics, the cloud server 110 preferably holds image data and streak detection parameters for each type.

In step S751, the CPU 501 waits until the image data and streak detection parameter information transmitted from the MFP 102 are received in step S704. When the CPU 501 receives the image data and the streak detection parameter information (YES in step S751), the process advances to step S752.

In step S752, the CPU 501 makes the AI processing unit 503 perform streak detection and correction for the received image data by using the learned streak detection database saved in the database 504. The process then advances to step S753. Note that the streak detection processing executed by the cloud server 110 in step S752 may differ from the streak detection processing executed by the MFP 102. For example, the cloud server 110 may execute streak detection processing by using a neural network model. Although the cloud server 110 performs streak detection processing based on the same algorithm as that for the streak detection processing executed by the MFP 102, the cloud server 110 may perform trials on a plurality of parameter values.

In step S753, upon receiving a streak detection result from the MFP 102, the cloud server 110 determines whether the difference between the detection result received from the MFP 102 and the corrected image data processed by the AI processing unit 503 in step S752 is equal to or more than a predetermined value. Note that in step S753, the cloud server 110 may wait until a detection result is received from the MFP 102. If the difference between the received corrected image data and the corrected image data processed by the AI processing unit 503 is larger than the threshold (YES in step S753), the cloud server 110 makes the process advance to step S754 to save the image data received from the MFP 102 into the database 504. The image data saved in the database 504 is used to generate streak detection parameters (to be described later). If the processing result difference is smaller than the predetermined value (NO in step S753), the CPU 501 makes the process advance to step S755.

In step S755, the CPU 501 compares the streak detection parameter information received in step S751 with the streak detection parameters held in the database 504 to determine whether it is necessary to update the streak detection parameters in the MFP 102. If it is not necessary to update (NO in step S755), the CPU 501 terminates the processing in FIG. 7. If it is necessary to update (YES in step S755), the CPU 501 makes the process advance to step S756. The cloud server 110 transmits new parameters to the MFP 102 via the N/W IF 502 in step S756, and terminates the processing in FIG. 7.

In step S754, when image data is saved into the database 504, the image data is analyzed by the cloud server 110 at a predetermined timing and used to generate new streak detection parameters. An example of generating streak detection parameters will be described with reference to FIGS. 8A to 8D. The following will exemplify a case in which the parameters of an algorithm for discriminating a streak by focusing on the luminance difference between a background and a streak portion are updated. Note that the CPU 501 executes all the processing in this case.

Figure 8A:
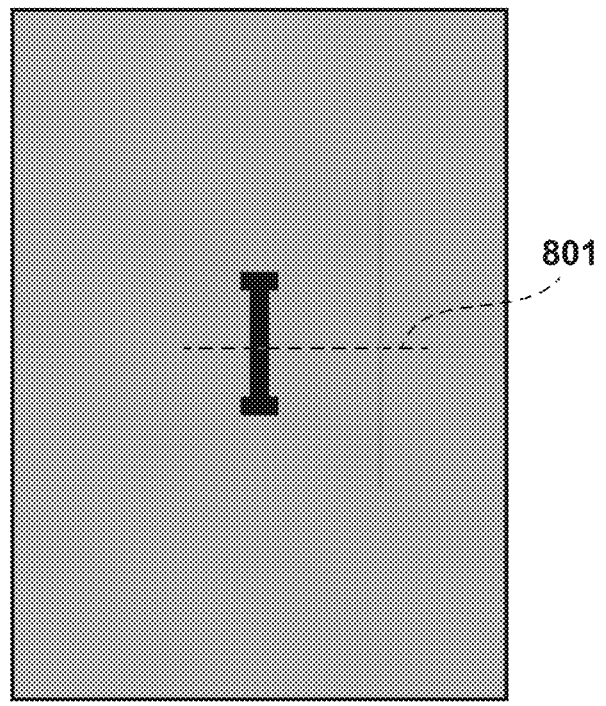
FIG. 8A is a view showing an example of image data having a character and a streak in an image whose background luminance is relatively low.
Figure 8B:
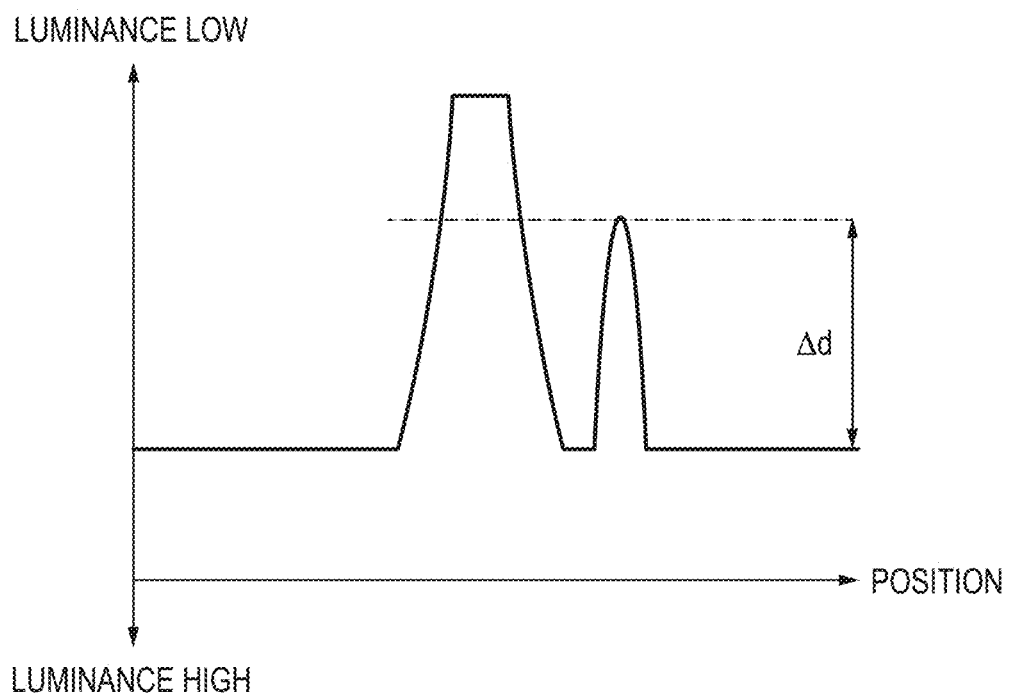
FIG. 8B is a graph showing the value of luminance on a line 801.
Figure 8C:
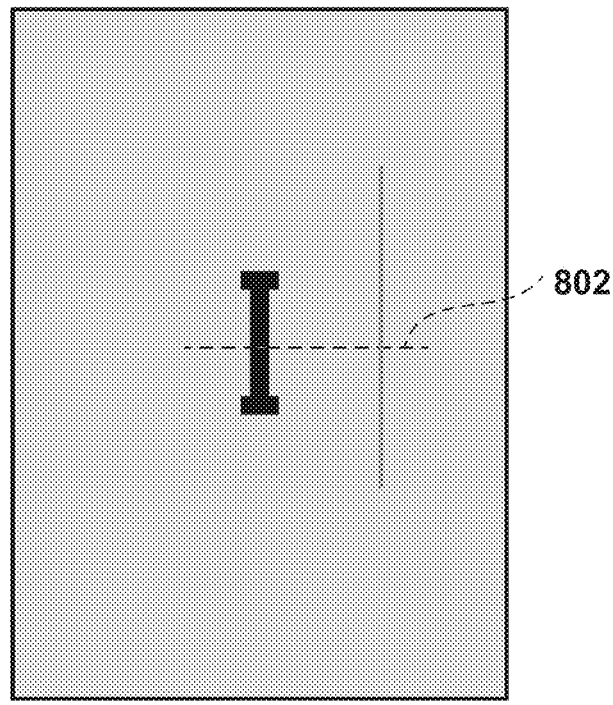
FIG. 8C is a view showing an example of image data having a character and a streak in an image whose background luminance is relatively high.
Figure 8D:
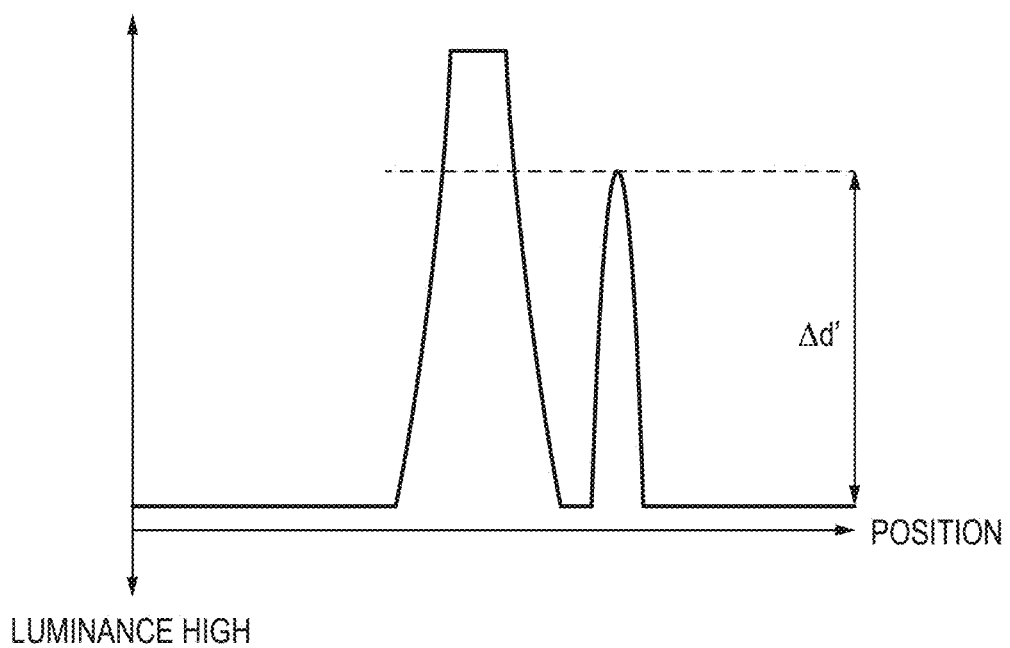
FIG. 8D is a graph showing the value of luminance on a line 802.

FIG. 8A shows an example of image data having a character and a streak in an image whose background luminance is relatively low. FIG. 8B is a graph showing the value of luminance on a line 801 in FIG. 8A. FIG. 8C is a view showing an example of image data having a character and a streak in an image whose background luminance is relatively high. FIG. 8D is a graph showing the value of luminance on a line 802 in FIG. 8C.

If there is a character and a streak in an image whose background luminance is low, a difference Δd between the background luminance and the streak luminance has a value smaller than that of the character portion, as shown in FIG.

8B. A portion having a value larger than the luminance difference Δd can be discriminated as an image on the document. Accordingly, the MFP 102 can determine, based on Δd as a parameter, that a portion having a luminance higher than the background luminance and a difference equal to or less than Δd from the background luminance is a streak, and perform detection/correction processing for the portion.

If a similar streak has been generated in an image whose background is light, the difference between the background luminance and the streak luminance becomes Δd' larger than Δd, as shown in FIG. 8D. Accordingly, when the same difference Δd as that in FIG. 8B is used as a detection parameter, the scanner image processing unit 211 mistakenly discriminates the streak as a character, resulting in difference from the detection result obtained by the AI processing unit 503.

In order to allow the MFP 102 to detect a streak even with the luminance shown in FIG. 8D, the cloud server 110 transmits, to the MFP 102, a signal for changing the luminance value of the streak detection parameter to Δd'. This enables the scanner image processing unit 211 to detect a streak.

This updated streak detection parameter is held in the database 504 and transmitted to the MFP 102 at the next update timing.

This case has exemplified the algorithm focusing on the luminance difference between a background image and a streak. However, the algorithm described above is not exhaustive, and various types of algorithms for the detection of streaks are known.

Figure 9:
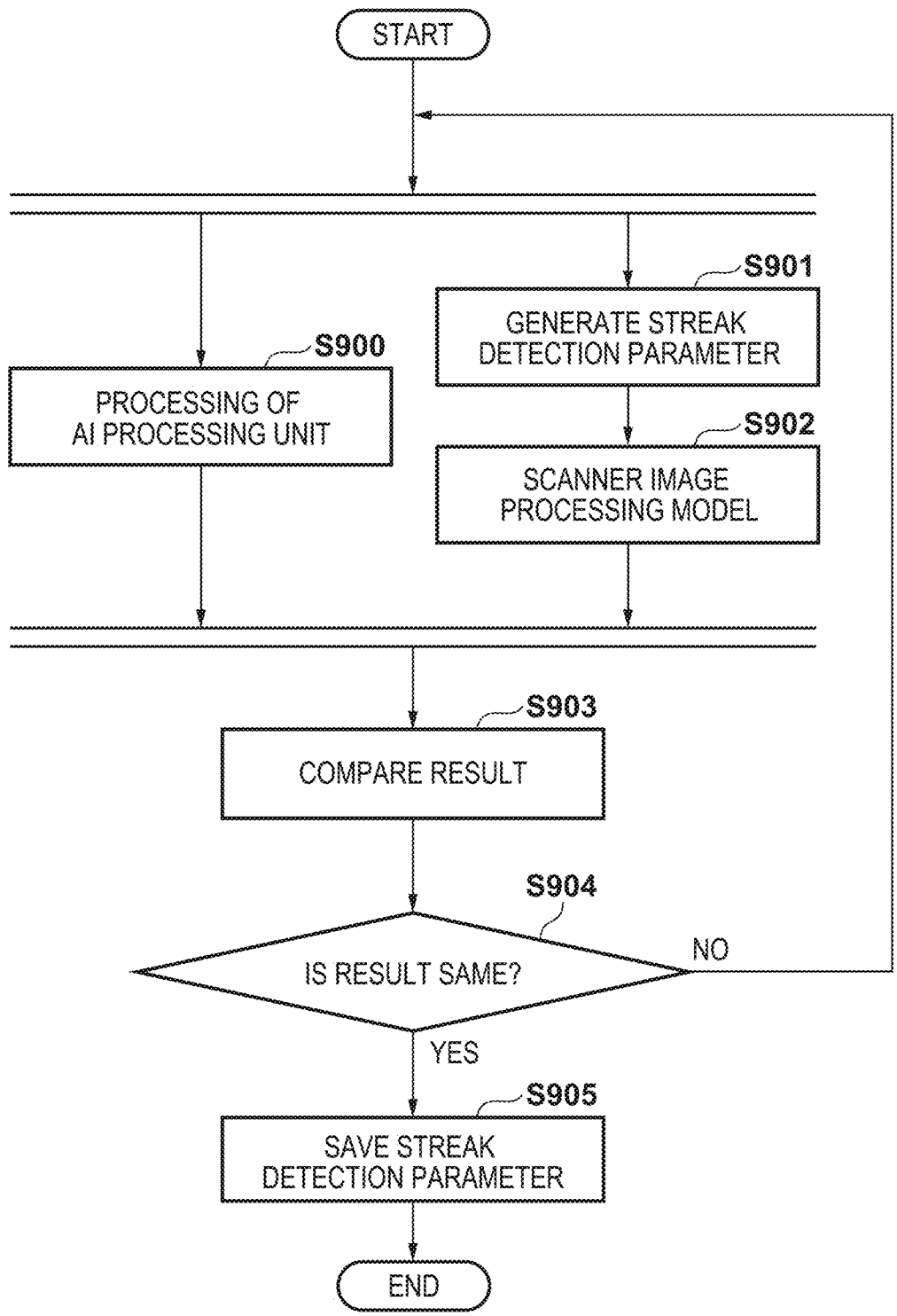
FIG. 9 is a flowchart showing an example of streak detection parameter generation processing executed by a cloud server according to an embodiment.

There is available another parameter generating technique, which is configured to compare with the streak detection result obtained by the AI processing unit 503 while automatically generating parameters by using a software model having the same function as that of the scanner image processing unit 211 and obtain parameters that can detect streaks with similar accuracy. This case will be described with reference to FIG. 9. Assume that the CPU 501 performs all the processing in the case.

First of all, in step S900, the AI processing unit 503 processes an image exhibiting the difference between the streak detection result obtained by the scanner image processing unit 211, which is saved in the database 504, and the streak detection result obtained by the AI processing unit 503, thereby detecting a streak.

In step S901, streak detection parameters are generated. The CPU 501 may generate these parameters by using random numbers. In step S902, the CPU 501 reads out a software model that has the same function as that of the scanner image processing unit 211 and is saved in the database 504, and processes the parameters generated in step S901 and the image data, thereby detecting a streak.

In step S903, the CPU 501 compares the result obtained in step S900 with the result obtained in step S902 to determine whether each pixel exhibits the same data. Upon receiving the comparison result and determining in step S904 that the result indicates the same streak detection/correction result, the CPU 501 makes the process shift to step S905. If the result is different from the streak detection/correction result, the CPU 501 makes the process shift so as to redo the flowchart.

Consider a case in which the above results do not completely match each other. In this case, if the number of pixels each exhibiting a difference in the image data is equal to or less than a predetermined threshold, the CPU 501 may determine not to update the parameters used by the MFP. In step S905, the CPU 501 holds the newly generated streak detection parameters in the database 504, and transmits them to the MFP 102 at the next update timing.

As described above, the MFP according to this embodiment updates streak detection parameters even for document image data from which no streak has been detected, while performing streak detection/correction in real time. This makes it possible to improve the detection accuracy of the streak detection algorithm.

Second Embodiment

In the first embodiment, the MFP executes streak detection using parameters, and transmits the detection result to the cloud server. The cloud server executes streak detection using the AI and adjusts the parameters by comparing the detection result received from the MFP with the detection result obtained by the AI. The second embodiment will exemplify an MFP that performs streak detection using an AI based on only the image data received from the MFP and performs streak detection based on the parameters transmitted from a cloud server that has adjusted the parameters. Note that a description of configurations, processing, and functions similar to those in the first embodiment will be omitted.

FIG. 10 is a flowchart showing processing performed by an MFP 102 and a cloud server 110 according to the second embodiment. Assume that the processing by the MFP 102 in FIG. 10 is executed by a CPU 201 of the MFP 102 in accordance with a program stored in a ROM 204 unless otherwise specified. In addition, the following description is made on the premise that a CPU 501 of the cloud server 110 executes processing by the cloud server 110 in FIG. 10 by executing a program stored in a ROM (not shown).

The processing in steps S1001 and S1002 is the same as that in steps S701 and S702 in FIG. 7, and hence a description of the processing will be omitted. Subsequently, the MFP 102 makes the process advance to step S1003 to transmit scanned image data to the cloud server 110. The MFP 102 then makes the process advance to step S1004 to wait until parameters for streak detection corresponding to the scanned image data are received from the cloud server 110. Upon receiving the parameters, the MFP 102 makes the process advance to step S1005 to execute streak detection/correction, and then terminates the processing in FIG. 10.

Note that the MFP 102 sometimes fails to receive parameters from the cloud server 110 via the Internet due to disconnection or the like. The MFP 102 stores parameters in, for example, a storage (a ROM 204, an HDD 205, or the like). If no parameters are received from the cloud server 110 within a predetermined time, streak detection may be executed by using the parameters stored in the storage.

An example of the processing performed by the cloud server 110 that operates at the same time will be described next with reference to FIG. 10.

Processing in steps S1051 and S1052 is the same as that in steps S751 and S752, and hence a description of the processing will be omitted. Subsequently, the cloud server 110 makes the process advance to step S1053 to adjust a parameter based on a streak detection result. For example, the parameter may be at least one of the following values shown in FIG. 8B: a background luminance value, a character luminance value, a streak luminance value, and the difference between the background luminance value and the streak luminance value. Alternatively, the parameter may be at least one of the ranges of luminance values of the background, character, and streak described above. The cloud server 110 then makes the process advance to step S1054 to transmit the adjusted parameter to the MFP 102, and terminates the processing in FIG. 10.

Other Embodiments

The embodiments have exemplified the case in which streak detection is performed based on luminance values. However, streak detection may be performed based on arbitrary parameters for image data, other than luminance values, such as brightnesses and RGB values.

The embodiments have been described on the assumption that the cloud server 110 is a single computer. However, the function of the cloud server 110 may be implemented by a plurality of computers. In this case, the plurality of cloud servers 110 may be communicable via the Internet, and at least one cloud server 110 may be located on the network 104 in the office 101.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-026475, filed on Feb. 19, 2020, which is hereby incorporated by reference herein in its entirety.

What is claimed is:

1. An image processing apparatus comprising:
   a scanner that scans a document to generate image data;
   a controller or a circuit that detects a streak included in the generated image data by using a parameter for detecting the streak; and
   a network interface that transmits at least the generated image data and a detection result of the streak to an external apparatus,
   wherein the network interface receives a new parameter, the new parameter being transmitted based on the detection result and another detection result of the streak included in the transmitted image data by the external apparatus, and
   wherein the image processing apparatus changes the parameter with the received new parameter.

2. The apparatus according to claim 1, wherein the controller or the circuit further corrects the streak included in the generated image data when the controller or the circuit detects that a streak is included in the image data.

3. The apparatus according to claim 1, wherein the network interface further transmits the parameter, and
   wherein the network interface further receives the new parameter, the new parameter being transmitted based difference between the detection result and the another detection result of the streak included in the transmitted image data by the external apparatus.

4. The apparatus according to claim 1, wherein the network interface transmits the image data to the external apparatus before the controller or the circuit detects the streak included in the generated image data.

5. The apparatus according to claim 1, wherein the controller or the circuit re executes streak detection processing for the generated image data by using the changed parameter when the image processing apparatus changes the parameter.

6. The apparatus according to claim 1, wherein the parameter includes a difference between a luminance value of a background of a document and a luminance value of a streak.

7. The apparatus according to claim 1, wherein the another detection result is obtained by a detecting process using a learned model by the external apparatus.

8. A server apparatus comprising:
   a network interface that receives, from an image processing apparatus, image data generated by scanning a document by a scanner of the image processing apparatus and a detection result of a streak by using a parameter for detecting a streak by the image processing apparatus; and
   a controller or a circuit that detects the streak included in the received image data,
   wherein the network interface transmits, based on the received detection result and another detection result by the controller or the circuit, a new parameter to the image processing apparatus to cause the image processing apparatus to change the parameter with the new parameter.

9. The apparatus according to claim 8, wherein the controller or the circuit detects the streak using a learned model.

10. A control method for an image processing apparatus, the method comprising:
    scanning a document to generate image data;
    detecting a streak included in the generated image data by using a parameter for detecting the streak; and
    transmitting at least the generated image data and a detection result of the streak to an external apparatus,
    receiving a new parameter from the external apparatus, the new parameter being transmitted based on the detection result and another detection result of the streak included in the transmitted image data by the external apparatus, and
    changing the parameter with the received new parameter.

11. A non-transitory storage medium storing a program executed by an image processing apparatus, the program causing a computer to execute
  scanning a document to generate image data;
  detecting a streak included in the generated image data by using a parameter for detecting the streak; and
  transmitting at least the generated image data and a detection result of the streak to an external apparatus,
  receiving a new parameter from the external apparatus, the new parameter being transmitted based on the detection result and another detection result of the streak included in the transmitted image data by the external apparatus, and
  changing the parameter with the received new parameter.

* * * * *